United States Patent

Keulen et al.

[11] Patent Number: 6,079,866
[45] Date of Patent: Jun. 27, 2000

[54] MIXING APPARATUS FOR MIXING THERMOSETTING AND THERMOPLASTIC RESIN BLENDS PRIOR TO MOLDING

[75] Inventors: Jan P. H. Keulen, Ossendrecht; Joseph M. H. Janssen; Martin A. Van Nuus, both of Bergen op Zoom, all of Netherlands

[73] Assignee: General Electric Company, Schenectady, N.Y.

[21] Appl. No.: 09/026,205

[22] Filed: Feb. 19, 1998

[51] Int. Cl.⁷ .............................. B01F 15/02; B01F 15/06
[52] U.S. Cl. .......................... 366/144; 266/268; 425/207
[58] Field of Search ..................... 366/262, 267, 366/268, 269, 77, 189, 176.3, 241, 182.2, 167.1, 172.1, 174.1, 160.4; 425/207

[56] References Cited

U.S. PATENT DOCUMENTS

| | | | |
|---|---|---|---|
| 3,353,918 | 11/1967 | Perrin | 366/241 |
| 3,700,215 | 10/1972 | Hardman et al. | 366/268 |
| 3,763,088 | 10/1973 | Izawa et al. | |
| 3,860,218 | 1/1975 | Hurlimann | 366/268 |
| 4,350,650 | 9/1982 | Cereghini | 366/267 |
| 4,623,558 | 11/1986 | Lin . | |
| 5,000,670 | 3/1991 | Capelle | 366/77 |
| 5,250,228 | 10/1993 | Baigrie et al. . | |
| 5,382,384 | 1/1995 | Baigrie et al. . | |

FOREIGN PATENT DOCUMENTS

| | | |
|---|---|---|
| 0 121 965 | 10/1984 | European Pat. Off. . |
| 0 213 671 | 3/1987 | European Pat. Off. . |
| 537 005 B1 | 4/1993 | European Pat. Off. . |

Primary Examiner—Tony G. Soohoo

[57] ABSTRACT

A mixing process apparatus for discharging polymer material into a mold comprising a resin passage having an inlet for receiving polymer material and an outlet for discharge polymer material for molding, a first and second chamber communicates with said passage with each of said first and second chambers having a variable volume, said variable volume varying from a fill position for holding a predetermined volume of said polymer material to a discharge position for emptying polymer material, said first and second chamber being adapted for movement to transport said polymer material from a first mix position where one chamber is in a fill position and the other chamber is in an emptying position to a second mix position wherein said one chamber moves to an emptying position and said other chamber moves to a fill position, said first and second chamber being adapted for discharging said polymer material for molding when each of said chambers is in an emptying position.

21 Claims, 3 Drawing Sheets

MIXING APPARATUS FOR MIXING THERMOSETTING AND THERMOPLASTIC RESIN BLENDS PRIOR TO MOLDING

FIELD OF THE INVENTION

The invention relates to an apparatus and process for molding and shaping polymer materials.

BACKGROUND OF THE INVENTION

Processes for the molding and shaping of polymer blends comprising thermoplastic polymers blended with reactive materials are generally known. Some thermoplastic polymers are difficult to mold and shape in view of their high processing temperature. By blending the polymers with uncured or low molecular weight reactive type resins, such as epoxy resins, it becomes possible to shape the polymers at lower temperatures. The shaped blend is then cured to obtain the final article.

One such process is described in U.S. Pat. No. 3,763,088 where a non-crystalline thermoplastic resin is blended with uncured epoxy resin. The blends can be prepared by dry blending and fusion mixing the ingredients in a melt extruder at elevated temperatures. The hot melt may be shaped by injection molding. Typically the hot melt is directly injected into the mold. The relative quantity of epoxy resin is chosen such that a final structure results in a continuous phase of polymer particles in which uncured epoxy resin particles have been dispersed. To obtain such a structure it is essential to use epoxy resins with a molecular weight which is sufficiently high. The examples use epoxy resins with molecular weights of 3600 to 8,000.

U.S. Pat. No. 4,623,558 describes a process wherein a thermoplastic resin is blended with an uncured epoxy resin and a thermal initiator or a photo initiator at a temperature below the curing temperature of the system. The blend after combination with glass mats is heated and cured. For polymers with high melting temperatures or high glass transition temperatures, such as polyphenylene ethers, it is however not possible to get homogeneous blends of the polymer, the epoxy resin and the initiator are at temperatures below the curing temperature where the relative amount of thermoplastic resin is too high. In practice, the process of this patent is only suitable for the processing of blends which after curing form a continuous phase of a cured epoxy resin in which particles of the thermoplastic polymer have been dispersed.

U.S. Pat. No. 5,382,384 and its parent U.S. Pat. No. 5,250,228 describe a process wherein a thermoplastic resin, a thermosetting resin, a conductive filler and a curing agent are mixed together wherein the mixture is shaped below the curing temperature of the mixture and wherein the shaped mixture is heated quickly to the curing temperature and is cured at the curing temperature. The mixing is performed below the curing temperature of the curing agent. As described before this makes it impossible for high melting polymers like polyphenylene ether to be used in relatively large quantities.

European patent application EP-B-0 537 005 describes a process for the manufacture of prepregs wherein a polyphenylene ether polymer is blended with a liquid epoxy material, optionally with a flame retardant and a catalyst, at a temperature of 100–130° C. The blend is subsequently granulated into particulates and the particulates are combined with one or more reinforcing cloth or fiber and the thus obtained combination is cured under pressure at 210° C. to 250° C. The blending of the polyphenylene ether and the epoxy are performed at a temperature below the curing temperature of the epoxy resin. This limits the possibilities of the process considerably.

In Polymer, Vol. 35, no. 20, 1994, page 3450 a process is described where solutions of an epoxy and polyphenylene ether (PPE; a thermoplastic resin) are prepared in a Brabender kneader at 175° C. by kneading for about one hour. As an alternative it has been proposed to prepare the blend by mixing for 5–10 minutes in a co-rotating twin screw extrudeN. Subsequently a curing agent is added to the homogeneous solution in the Brabender mixer for about two minutes, the obtained compound is compression molded and cured by curing cycles of two hours followed by a post-cure treatment of four hours at 200° C.

Mixing of epoxy/polyphenylene ether (PPE) mixtures, in particular those with more than 20% by wt of PPE, at temperatures of 175° C. results in compositions which are too viscous for many commercially useful shaping processes such as injection molding.

It has now been found that even with curing agents or catalysts which are fast at the chosen melt mixing temperatures it is possible to work at high temperatures (in the case of PPE at temperatures of over 220° C.) without causing premature reaction of the epoxy resin. This can be achieved by ensuring a quick mixing and complete discharge of the prepared shot. The mixing time in the second step of process of the invention may, depending upon the nature of the constituents and the required temperatures, be far below two minutes.

The present invention provides an injection molding process and apparatus for the shaping of polymer thermosetting materials which are curable to a final shape. With the process and apparatus of the present invention it is possible to use relatively fast curing and/or polymerization systems resulting in short cycle times. With the process and apparatus of the invention it becomes possible to shape polymers at temperatures below their normal processing temperatures. This is of importance for the processing of thermoplastic materials which are unstable or sensitive to oxidation at their processing temperature. With the process and apparatus of the invention it is possible to shape the blend and to cure and/or polymerize the epoxy resin in the blend after the shaping step even when relatively large quantities of thermoplastic resin with a high melting point or a high glass transition temperature are used.

SUMMARY OF THE INVENTION

As set forth above, mixing a reactive agent into a blend of a thermoplastic and thermoset resin is desirable conducted at elevated temperatures to have the resin in the molten state. At such temperatures, curing occurs during the mixing. As a result, it is desirable to have just in time preparation of a homogeneous mixture, complete discharge of the mixture during molding, good purging of the mixer volume without any loss of time or resin. The curing chemistry is such that some time is allowed for the mixing step whereas it is fast enough to complete curing in a hot mold within an acceptable cycle time. Mixing a curing agent into a precompounded thermoplastic in a short time is difficult since curing begins immediately. The present invention is desirable for enhancing the molding of curable type resins.

An additional broader objective of the present invention is to obtain "just in time" mixing and followed by molding. According to the present invention, a resin is may be desirable mixed with a reactive or non-reactive agent just prior to molding. In the case of a non-reactive agent, such as colorant or stabilizer ingredient, the non-reactive agent may be added just prior to the molding step. In the case of a reactive agent, such as a curing agent or reactive solvent, the reactive agent is added just in time prior to molding. As an example, a reactive solvent may result in a one phase system. The present application describes the specific case where PPE/epoxy type system is utilized in conjunction with a curing agent.

An additional objective of the present invention is to obtain substantially complete discharge of a prepared or mixed batch of resin into the mold. As a result of such complete discharge, the next batch is initially free from the reactive or unreactive agent as the case may be. The agent is then metered into the next batch according to a desired predetermined amount.

The present invention provides a mixing apparatus for discharging polymer material into a mold and comprises a resin passage having an inlet for receiving polymer material and an outlet for discharge polymer material for molding, a first and second chamber communicating with said passage, each of said first and second chambers having a variable volume, said variable volume varying from a fill position for holding a predetermined volume of said polymer material to a discharge position for emptying polymer material, said first and second chamber being adapted for movement to transport said polymer material from a first mix position where one chamber is in a fill position and the other chamber is in an emptying position to a second mix position wherein said one chamber moves to an emptying position and said other chamber moves to a fill position, said first and second chamber being adapted for discharging said polymer material for molding when each of said chambers is in an emptying position.

The present invention provides a process for molding a polymer material by mixing a resin with an agent to form a blend just prior to discharging the mixed blend into a mold to form a shaped product.

In preferred embodiments, the process comprises discharging a first mixed batch into a mold to form an first article, introducing a unmixed batch of material into the volume formed by the first and second chambers while the first article is being formed, releasing the first article from the mold, and mixing the unmixed batch with an agent to form a second mixed batch just prior to releasing the first article from the mold, and introducing the second mixed batch into the mold and repeating the above steps with additional batches of material.

Also, according to preferred embodiments, mixing comprising introducing a charge of polymer material into the mixing apparatus or unit and mixing the charge with an agent by transporting the charge from a first chamber to a second chamber through a mixing chamber in the passageway.

In a preferred embodiment, the polymer charge may comprises a at least one thermoplastic polymer, such as an engineering thermoplastic material, at a temperature above the glass transition temperature or above the melting temperature of the thermoplastic polymer. The polymeric material polymer is (a) mixed with reactive agent, such as a reactive solvent which may be (i) an uncured epoxy resin, or (ii) an epoxy curing agent or a catalyst to form a blend; (b) further melt mixing at a temperature above the glass transition temperature or above the melting temperature of the thermoplastic polymer the other of (i) an epoxy resin, or (ii) a epoxy curing agent or a catalyst, with the blend in (a) to form a substantially uncured but essentially curable and/or polymerizable composition; (c) forming a shaped product from the composition in (b); and (d) fast curing and/or fast polymerizing the optionally formed shaped product.

The process introduces a charge volume of plasticized resin into an intermediate mixing unit instead of directly into the mold as a shot as is typically in prior art devices. Next the curing agent is injected and mixed. As soon as the mixture is ready, it is injected into the hot mold where curing can proceed. The mixer unit is purged of active resin in order to prevent any residual of activated resin from blocking the system. The mixing unit is adapted to be inserted between the barrel of an extruder and the mold of an existing molding machine so that modifications to the regular molding cycle are kept to a minimum.

In a preferred embodiment, the mixing unit consists of two chambers connected by the passageway which preferably includes a static mixer. Since it is desirable, and even mandatory, to expel substantially entire volume of activated resin into the mold, the chambers have pistons that can either transfer the resin back and forth from one chamber to the other, or that can squeeze both chambers empty. The unit desirable includes its own power supply and controls which are preferably have a modular set up. Temperature and operating protocol are desirably set independently of the molding cycle with which it communicates for synchronization.

DESCRIPTION OF DRAWINGS

The drawings schematically illustrate suitable apparatus for the process of invention.

DETAILED DESCRIPTION OF THE DRAWINGS

Figure 1:
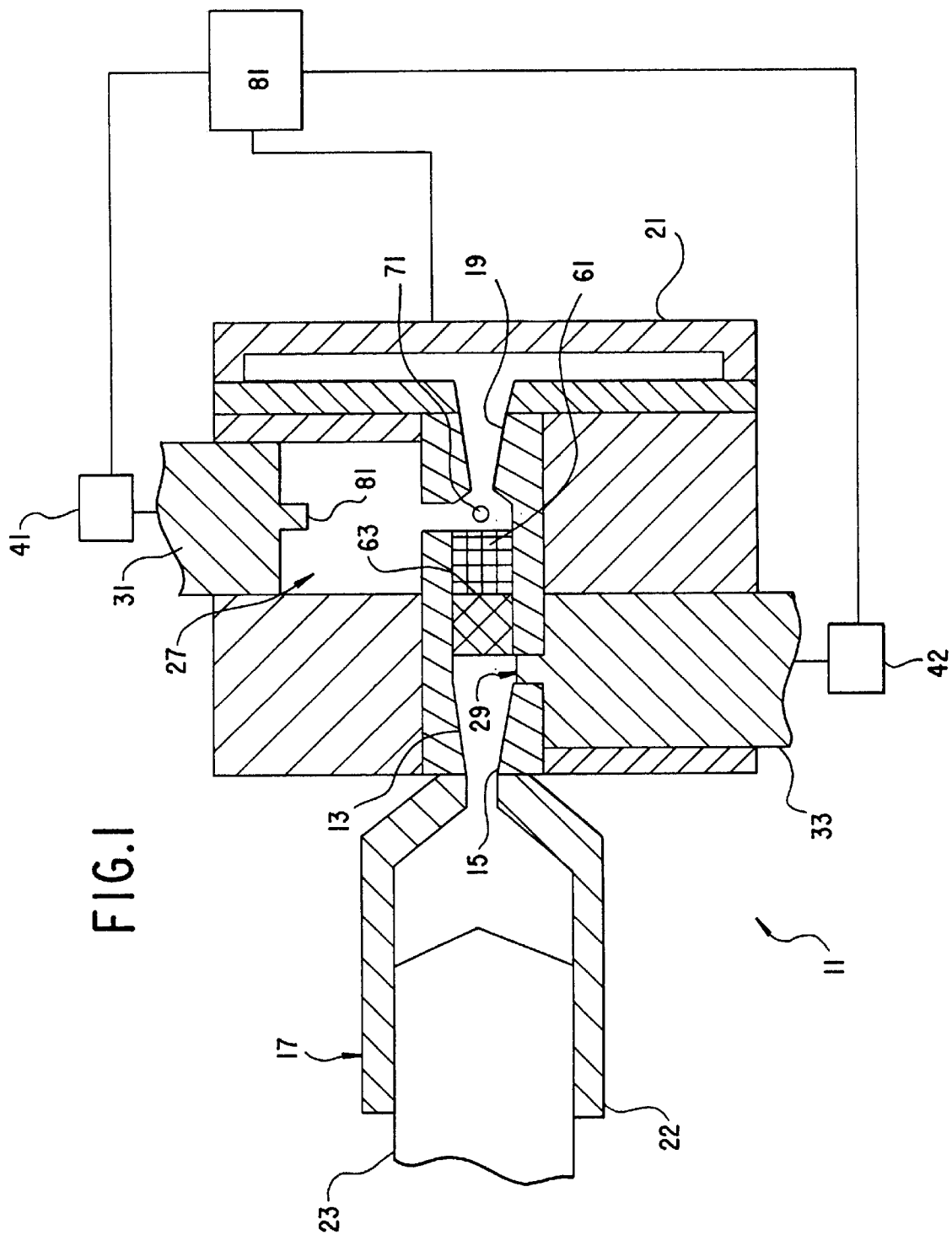
FIG. 1 shows the mixing apparatus of the present invention connected to an extruder and a mold.

In the preferred embodiment as illustrated in FIG. 1, the mixer apparatus 11 includes a resin passage or passageway 13 having an inlet 15 communicating with a source 17 of heated resin under pressure and an outlet 19 communicating with a mold 21. The resin source 17 may be an injection molding machine. The drawings illustrate an injection molding machine which includes a barrel 22 having an internal plunger 23 which moves the resin toward an outlet which is connected to the mixer apparatus of the present invention.

The mixer apparatus 11 includes first and second chambers 27, 29 which each communicate with the passageway 13. As illustrated in the drawings, the chambers 27, 29 are cylindrical and include the respective movable pistons 31, 33. Movement of the pistons 31, 33 results in a change in the volume of the respective chamber. The path length of the pistons 31, 33 is preferably adjustable for matching the volume of the prepared charge or batch of resin exactly to the shot size of the mold. Each of the pistons 31, 33 is preferably connected to a respective drive means 41, 42 for actuating and moving a respective piston. The drive means 41, 42 are in turn connected to an appropriate controller 81 for actuating the drive means. The controller is operably connected with each drive means 41, 42 for actuating the drive means according to an appropriate sequence. Also, the controller 81 is operably connected to a agent injection system for actuation of the injector 71 in accordance with a desired controlled sequence where the agent, either an active or inactive agent, typically a liquid, may be metered into the resin in a controlled amount for mixing just prior to discharge into the mold 21.

Intermediate the chambers 27, 29, the passageway 13 includes a mixing zone 61 for enhancing the mixing of the resin as it is transported from one chamber to the other chamber. The mixing zone 61 is preferably in the form of static mixer 63 in passageway 13 which imparts distributive mixing flow characteristics to the resin as it passes through the passageway 13 during the mixing cycle. The static mixer 63 includes projections which disrupt normal flow through the passageway 13.

In a preferred embodiment, inactive or non-active resin from the extruder is forced into the chambers 27, 29 through the passageway 13. An agent is injected into the inactive resin just prior to mixing. As illustrated in FIG. 1, the agent typical in the form of a liquid is injected into the passageway 13 during the flow from one chamber to the other. FIG. 1 illustrates the agent injector 71 downstream of the inlet 15 of the passageway 13 and in proximity to the mold 21. It is also contemplated that the agent injector 71 may be mounted in other positions such as adjacent the inlet 15. Preferably the injector 71 is mounted perpendicular to the flow of resin along the passageway.

The entire mixing unit 11 is mounted onto the back of a molding machine with the fixed side of the tool is then mounted onto the mixing unit.

The mixing unit 11 preferably has its own heating and power supply. Preferably, the mixing zone 61 and curing agent injector 71 is mounted in a removable plate which can be exchanged for other plates and injectors for imparting different mixing and injecting properties to the resin being mixed.

Figure 2:
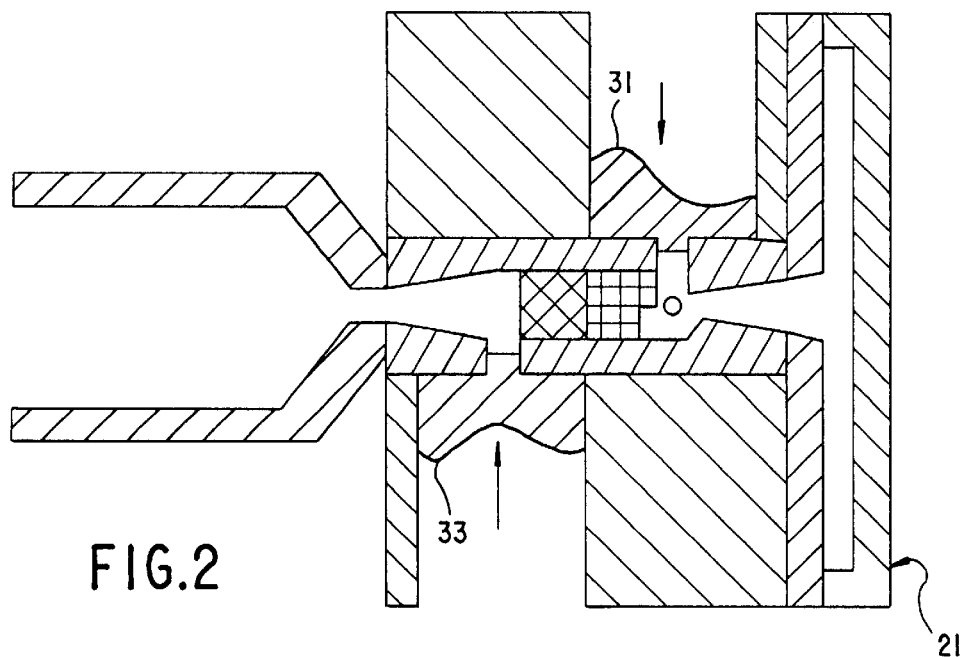
FIG. 2 illustrates the position of the pistons during one process step.
Figure 3:
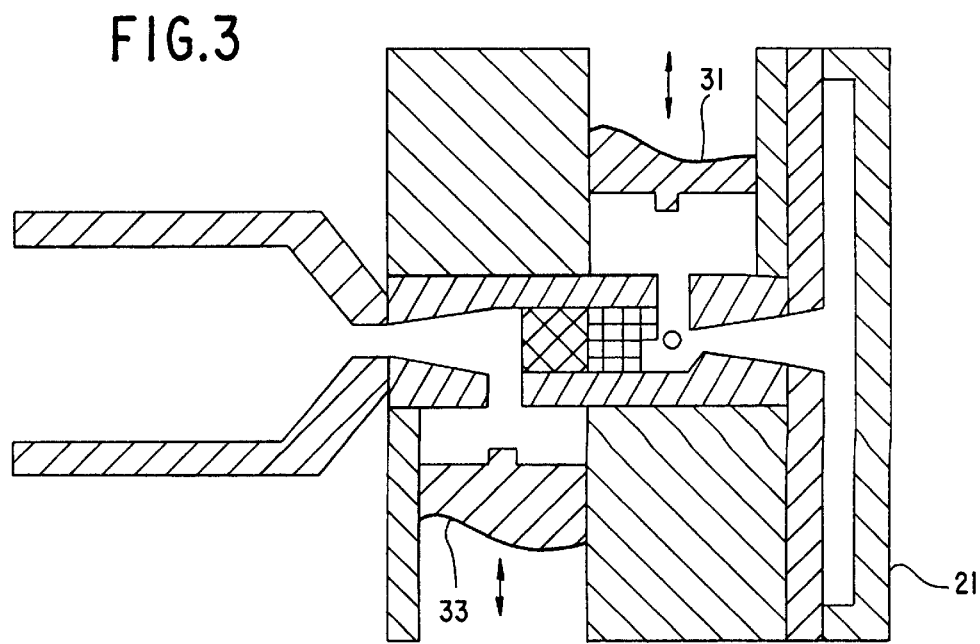
FIG. 3 illustrates the movement of the pistons during another process.
Figure 4:
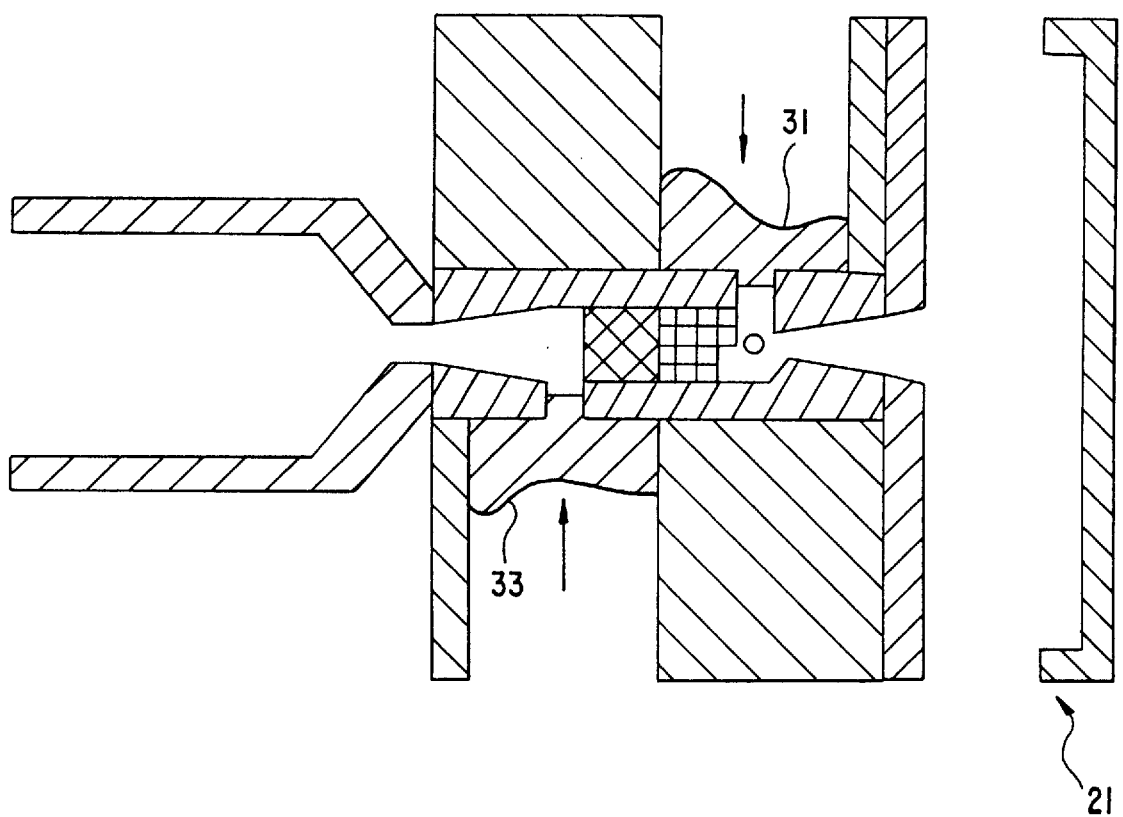
FIG. 4 illustrates the position of the pistons and the position of the mold during the ejection of a molded part.

The configuration of the mixing apparatus 11 is illustrated at various stages during a typical molding cycle as set forth in FIG. 2 to FIG. 4. As illustrated in FIG. 2, the prepared activated resin batch is pushed into the mold by squeezing the chambers empty. The respective pistons 31, 33 move in opposite directions relative to the axis of the passage. Each of the pistons 31, 33 may include at its inner end a projection 81 which fits into an outlet from the respective chambers 27,29. The nipple or projection 81 is provided to minimize dead volume and maximize the removal of resin from a respective chamber. Immediately, a small injection step of the molding machine is conducted to push the activated resin out of the mixer channel into the mold. The interface between active and inactive resin is tuned to be right at the location where the sprue should break off at demolding. While resin is curing in the hot mold, the mixed resin from the extruder is injected into the downstream chamber during a second injection step of the molding machine.

As illustrated in FIG. 3, the new batch of inactive resin material can be flushed back and forth between the two chambers to purge the static mixer, multiple times. According to this cycle, the pistons move in opposite directions so that the total volume of the chambers remains substantially constant during the cycle. In this way, any residual activated resin is diluted over the new batch. The part continues to cure in the mold under holding pressure during a time that is necessary to reach sufficient conversion.

Then, the new batch is just in time activated with curing agent. The required volume of curing agent is injected during flow between the chambers, during a number of passages it is distributed as homogeneously as necessary.

Just in time means that the reactive ingredient or agent, such as a curing agent, is added to the resin just prior molding so that the reactive ingredient is thoroughly mixed and discharged from the mixing prior to completely reacting. The reacting of the reactive agent with the resin is desirably completed in the mold to sufficient extent to harden and permit the formation of the resin into the desired shape. Now, the new batch is ready and the cured part is released as illustrated in FIG. 4. It is also contemplated that the reactive agent may be a non-reactive agent such as a colorant. In this case, it may be desirable to introduce the unreactive or non-reactive agent into the resin at a very early stage of the mixing cycle. In either case, as previously discussed, it is desirable to substantially completely discharge the mixed batch of resin into the mold prior to introducing another batch for mixing. In either case, it is desirable that the shot of resin has a precisely metered amount of agent, either reactive or non-reactive, thoroughly mixed prior to discharge into the mold.

The polymeric masses can be for example the blend of a thermoplastic polymer and a reactive solvent resin on the one hand and a blend of a carrier resin and a curing agent or catalyst. Upon mixing in the static mixers a substantially uncured but essentially curable composition is obtained which enters the mold for optional shaping and curing.

In a specific preferred embodiment for illustrative purposes, the present invention provides a process for preparing a polymer composition comprising: (a) melt mixing at least one thermoplastic polymer with one of (i) an uncured epoxy resin, or (ii) an epoxy curing agent or a catalyst to form a blend; (b) further melt mixing the other of (i) an epoxy resin, or (ii) a epoxy curing agent or a catalyst, with the blend in (a) to form a substantially uncured but essentially curable and/or polymerizable composition; (c) optionally forming a shaped product from the composition in (b); and (d) fast curing and/or fast polymerizing the optionally formed shaped product.

Upon curing and/or polymerization of the epoxy resin phase separation of the epoxy resin occurs. Upon curing and/or polymerization the polymer blend becomes much more viscous as can be determined by measuring the viscosity of the molten blend. With substantially no curing is meant that the increase in the viscosity (after an initial decrease upon melting) has not yet started.

In the process of the invention the relative quantities of the at least one thermoplastic polymer and epoxy resin are preferably chosen such that after curing and/or polymerization the thermoplastic polymer forms a continuous phase in which particles of cured and/or polymerized epoxy resin are dispersed or such that the polymer phase and the epoxy phase form an interpenetrating network.

In the process of the invention it is possible to incorporate other components. This is possible in steps (a) and (b) of the process. Good mixing can be achieved quickly with a short residence time to avoid substantial curing or polymerization prior to molding.

Sufficient mixing of the curing agent and/or catalyst with the blend of the thermoplastic polymer(s) and the epoxy resin is important to obtain good mechanical and thermal properties of the final product after curing or polymerization.

In one of the several process options suitable for the process of the present invention, an extrusion device (as is schematically shown in FIG. 1) is configured in such a way that for example a pre-extruded homogeneous, one-phase blend of a polyphenylene ether (PPE)/epoxy mixture, which shows very high flow and requires considerably lower melt temperatures than pure PPE, can be added in the feed-throat (1) of the extruder. The barrel set temperatures and the screw design are such that the thermoplastic polymer, for example PPE, and epoxy resin are melted and mixed. The barrel temperature ranges from about 150° C. to about 270° C., if the thermoplastic is PPE. The temperature range for melting and mixing the thermoplastic resin, is then at or above the Tg (glass transition temperature) or the melting point of the thermoplastic resin. Then in the mixing apparatus 11 of the present invention, downstream of the extrudeN, the homogeneous blend of the thermoplastic and the epoxy resin is blended with a suitable epoxy resin curing agent and/or catalyst (for simplicity hereinafter sometimes will be referred to a "curing agent" only where a curing agent and/or a catalyst is intended) by adding the curing agent as previously mentioned. Adding the curing agent in the shortly before the molten blend exiting the mixing apparatus is found to be critical in blending the fast curing system into PPE/epoxy. The blends comprising PPE, epoxy, and curing agent are then injected in molten form into the mold or through other shaping means where curing is completed and the epoxy resin component of the molded article is cured under phase separation of the epoxy resin.

The process of the invention is however in particular advantageous when it is desired to mold and shape polymer blends with a high melting point or a high glass transition temperature. Examples of such polymer blends are blends comprising polyphenylene ethers, aromatic polycarbonates, aromatic polysulfone resins, polyethersulfones, polystyrene, syndiotactic polystyrene, polyamides, phenoxy resins, polyimides, polyetherimides, polyetherimide/silicone block copolymers, polyurethanes, polyesters, acrylic resins, styrene/acrylonitrile resins, styrene block copolymers and aliphatic polyketones (as described for example in EP-A-0 121 965 and EP-A-0 213 671).

The above mentioned polymers are well known and most of them are commercially available from various sources.

Other thermoplastic resins useful in for the invention are e.g. those mentioned in U.S. Pat. No. 4,528,346 or in EP-A-0 148 493, and are incorporated herein by reference.

Very suitable thermoplastic polymers are the polyphenylene ether resins (generally abbreviated as PPE). A commercially available PPE is poly(2,6-dimethyl-1,4-phenylene ether). Also useful are copolymers with various phenolic monomers indicated below, or the polymer with end groups containing amines chemically bonded (so called "Mannich-ends"). The PPE may be of a number average molecular weight of about 1000 to about 80,000, as described in U.S. Pat. No. 4,853,423. Additional description of "PPE" can be found in U.S. Pat. Nos. 4,496,695 and 5,141,791, or EP 0 557 086. Suitable PPE's are also end-group modified and "capped" PPE's or otherwise "modified" PPE's as described in EP-A Also included "functionalized" PPE's wherein the PPE has been modified with reactive groups as; and EP-A-0 283 775. The PPE resins and modified PPE resins according the present invention can also be admixed with styrene polymers (vinyl aromatic (co-)polymers) and the graft polymers with other polymers as described in EP-A-0 557 086. The styrene (co) polymers can be polystyrene (PS), crystal clear polystyrene (ccPS), high impact polystyrene (HIPS). Specifically can be mentioned here styrenic copolymers with acrylonitrile and optionally rubbers (styrene-acrylonitrile copolymers=SAN, acrylonitrile-butadiene-styrene terpolymers, acrylonitrile-styrene-acrylate terpolymers and styrene-maleic anhydride copolymers. High acrylonitrile SAN, and polyacrylonitrile, and high maleic anhydride copolymers are useful in this process. Blends of these copolymers with PPE are also useful.

The epoxy resin serves as a reactive solvent for the thermoplastic polymer in the present invention. Epoxy resin is used herein to mean any of the conventional dimeric, oligomeric or polymeric epoxy materials containing at least one epoxy functional groups. Useful compounds are described in: U.S. Pat. No. 5,250,228 or EP-A-0 148 493; and are incorporated herein by reference.

Curing agent and/or catalysts are used to facilitate conversion of a low molecular weight epoxy resin into a high molecular weight, usually crosslinked, resin no longer miscible with the thermoplastic polymer(s).

Curing agents are defined as agents which react stoichiometrically with the epoxide groups on the epoxy resins.

Useful classes of curing agents are materials selected from the following list: aliphatic amines, aliphatic amine adducts, aromatic amines, aromatic amine adducts, amidoamines, polyamides, cycloaliphatic amines, anhydrides, polycarboxylic polyesters, isocyanates, phenol-based resins (such as phenol or cresol novolak resins, phenol terpene copolymers, polyvinyl phenol copolymers, bisphenol-A formaldehyde copolymers, bishydroxyphenyl alkanes).

Catalysts which may be used in conjunction with apparatus of the present invention are compounds that initiate polymerization of epoxide groups, or accelerate reaction of curing agents with epoxide groups. Illustrative examples of catalysts are Listings of curing agents are found in Encyclopedia of Polymer Science and Engineering and incorporated by reference herein. Curing agents useful in the present invention are listed in U.S. Pat. Nos. 5,250,228 and 4,623, 558, and are incorporated herein by reference. Lewis acid salts, $BF_3$ complexes, imidazoles, dicyandiamide, and phosphonium salts. A detailed list of catalysts is provided in U.S. Pat. Nos. 4,833,423 and 4,496,695, and is incorporated herein by reference.

What is claimed is:

1. A mixing apparatus for discharging polymer material into a mold comprising a resin passage having an inlet for receiving polymer material which inlet has a source heated polymer material under pressure communicating with said inlet and an outlet for discharging polymer material for molding, a first and second chamber communicating with said passage, each of said first and second chambers having a variable volume, said variable volume varying from a fill position for holding a predetermined volume of said polymer material to a discharge position for emptying polymer material, said first and second chambers being adapted for movement to transport said polymer material from a first mix position where one chamber is in a fill position and the other chamber is in an emptying position to a second mix position wherein said one chamber moves to an emptying position and said other chamber moves to a fill position, said first and second chambers being adapted for discharging said polymer material for molding when each of said chambers is in an emptying position.

2. A mixing apparatus for discharging polymer material into a mold according to claim 1 comprising wherein said resin source is an extruder or an injection molding machine.

3. A mixing apparatus for discharging polymer material into a mold according to claim 1 comprising a means for injecting resin into said resin passage through said inlet.

4. A mixing apparatus for discharging polymer material into a mold according to claim 1 comprising cylindrically shaped chambers, each chamber includes a respective movable pistons wherein movement of said respective pistons results in a change in the volume of the respective chamber.

5. A mixing apparatus for discharging polymer material into a mold according to claim 4 wherein each piston is movable along a path having a length.

6. A mixing apparatus for discharging polymer material into a mold according to claim 5 wherein the length of said path is preferably adjustable for changing the desired volume.

7. A mixing apparatus for discharging polymer material into a mold according to claim 5 including a drive means, each of said pistons being operably connected to a respective drive means for actuating and moving a respective piston.

8. A mixing apparatus for discharging polymer material into a mold according to claim 7 including a controller, said drive means being connected to said controller for actuating said drive means.

9. A mixing apparatus for discharging polymer material into a mold according to claim 1 including a mixing zone for enhancing the mixing of the resin as it is transported from one chamber to the other chamber.

10. A mixing apparatus for discharging polymer material into a mold according to claim 9 wherein said mixing zone includes a static mixer to distributive mixing flow characteristics to the resin as it passes through the passageway during the mixing cycle.

11. A mixing apparatus for discharging polymer material into a mold according to claim 1 including an injector for introducing a reactive or non-reactive agent to said polymer.

12. A mixing apparatus for discharging polymer material into a mold according to claim 11 wherein said injector is positioned in said passageway.

13. A mixing apparatus for discharging polymer material into a mold according to claim 11 wherein said injector is mounted perpendicular to the flow of resin along the passageway.

14. A modular mixing apparatus connected directly to an injection molding machine comprising a resin passage having an inlet for receiving polymer material which inlet has a source heated polymer material under pressure communicating with said outlet and an outlet for discharging polymer material for molding, a first and second chamber communicating with said passage, each of said first and second chambers having a variable volume, said variable volume varying from a fill position for holding a predetermined volume of said polymer material to a discharge position for emptying polymer material, said first and second chambers being adapted for movement to transport said polymer material from a first mix position where one chamber is in a fill position and the other chamber is in an emptying position to a second mix position wherein said one chamber moves to an emptying position and said other chamber moves to a fill position, said first and second chambers being adapted for discharging said polymer material for molding when each of said chambers is in an emptying position.

15. A modular mixing apparatus according to claim 14 including a mixing zone for enhancing the mixing of the resin as it is transported from one chamber to the other chamber.

16. A modular mixing apparatus according to claim 15 wherein said mixing zone comprises a removable module.

17. A modular mixing apparatus according to claim 15 comprising a controller operably associated with said chambers for actuating said volume from said fill position to said discharge position and from said first mix position to said second mix position.

18. A modular mixing apparatus according to claim 17 including means for injecting a reactive agent, said controller being operable associated with said injecting means.

19. A modular mixing apparatus according to claim 18 wherein said controller operable to actuate said injection means prior to actuating said volume from a first mix position to a second mix position.

20. A modular mixing apparatus according to claim 19 wherein said controller is actuates said volume to a discharge position after actuating said volume from a first mix position to a second mix position.

21. A modular mixing apparatus according to claim 19 wherein said controller actuates said volume back and forth from a first mix position to a second mix position.

* * * * *